United States Patent [19]

Williams

[11] 4,274,426
[45] Jun. 23, 1981

[54] THRESHING APPARATUS

[76] Inventor: Dennis W. Williams, Rte. 1, Box 51, Toston, Mont. 59643

[21] Appl. No.: 135,256

[22] Filed: Mar. 31, 1980

[51] Int. Cl.³ ............................................. A01F 7/06
[52] U.S. Cl. .................................................. 130/27 T
[58] Field of Search ............ 56/14.6; 130/27 T, 27 R, 130/6, 30 R, 30 H

[56] References Cited

U.S. PATENT DOCUMENTS

| | | | |
|---|---|---|---|
| 752,182 | 2/1904 | Ross et al. | 130/27 T |
| 932,889 | 8/1909 | McMillin | 130/6 |
| 2,325,654 | 8/1943 | Borchers | 130/6 |
| 3,103,932 | 9/1963 | Buchele | 130/27 T |
| 3,464,419 | 9/1969 | Knapp et al. | 130/27 T |
| 4,139,013 | 2/1979 | Hengen | 56/14.6 |
| 4,178,942 | 12/1979 | Nusser | 130/27 T |

FOREIGN PATENT DOCUMENTS 1301169 8/1969 Fed. Rep. of Germany ......... 130/27 T

Primary Examiner—Jay N. Eskovitz
Attorney, Agent, or Firm—Rudolph L. Lowell; G. Brian Pingel

[57] ABSTRACT

The thresher apparatus includes a rotatable tapered threshing cylinder assembled within and in a concentrically spaced coaxially aligned operative relation with a rotatable tapered grain separating cylinder, with the space between the cylinders defining a threshing zone that has an inlet for receiving the grain to be threshed and an outlet for discharging the residual material. The separating cylinder has concave grates and separating grates in the peripheral surface thereof to provide for a grain threshing action and for a separation, by centrifugal force, of the threshed grain from the residual material over the entire peripheral surfaces of the cylinders. The spacing between the cylinders to accommodate different grains under varying field conditions may be varied by relative axial movement between the cylinders and by a variation in the relative rotational speeds of the cylinders.

3 Claims, 7 Drawing Figures

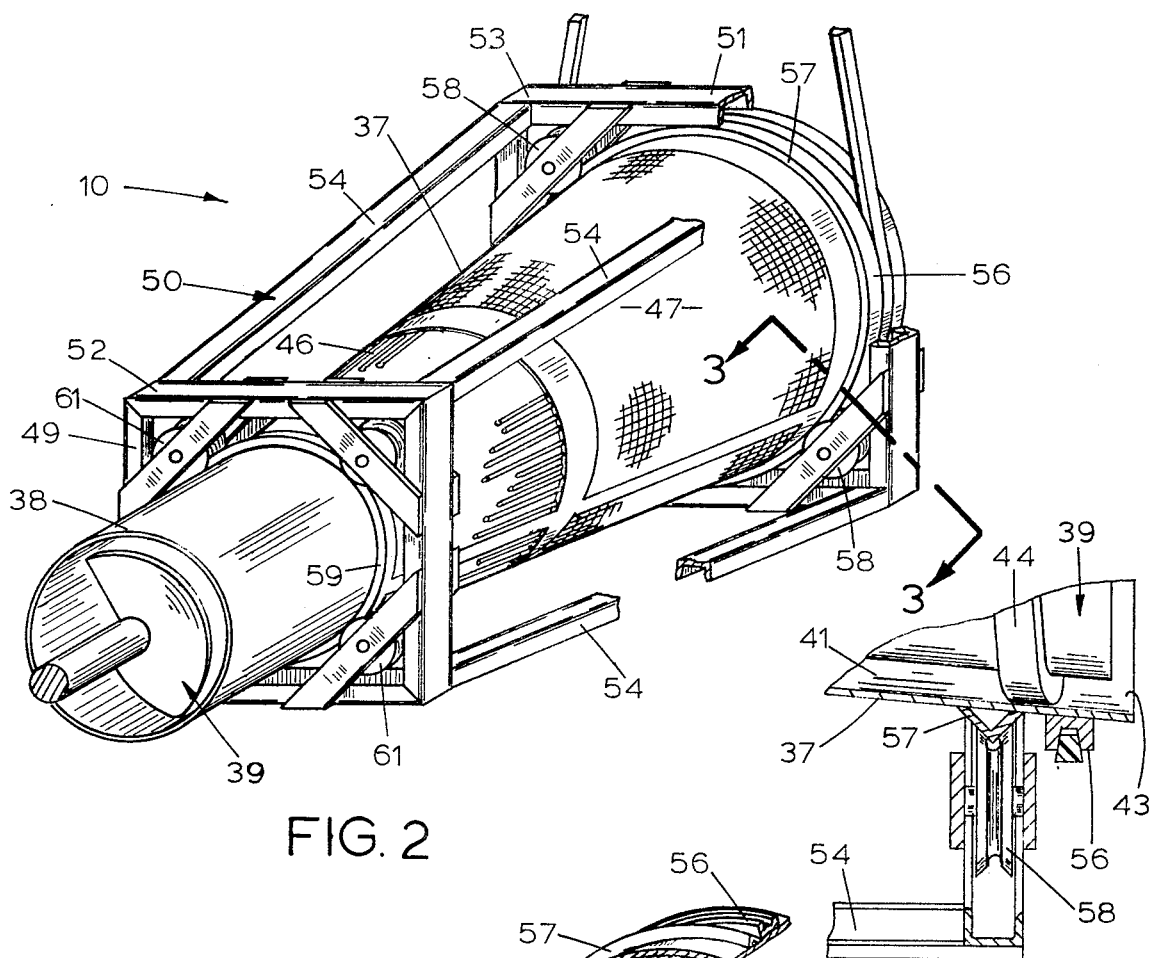
FIG. 2
FIG. 3
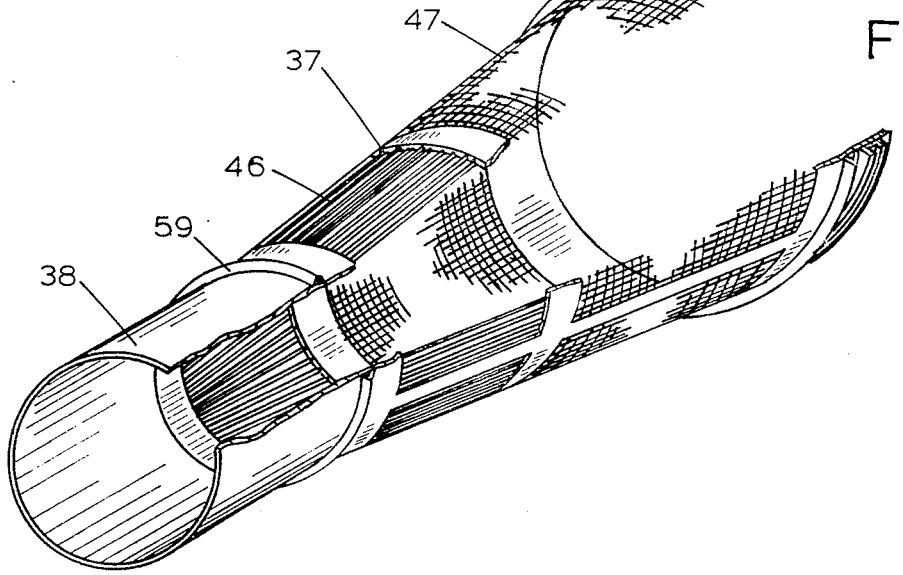
FIG. 4

4,274,426

THRESHING APPARATUS

BACKGROUND OF THE INVENTION

Grain threshing devices usually include a rotatable threshing cylinder operatively associated with stationary concaves that are normally opposite only a portion of the threshing cylinder. The separated grain passes through the concaves by the action of gravity. Additional threshing and separation may be accomplished by blowers or grain impact arrangements the operation of which is dependent upon the velocity and density differences between the threshed grain and the residual grain material. This type of apparatus, exemplified in U.S. Pat. No. 1,184,999, is of a generally low capacity due to the short time duration of the threshing and grain separating operations, the inability of the apparatus to efficiently handle different grain sizes under varying field conditions and the tendency of the grain residual materials to plug the separating mechanism so as to require frequent shut down time and operator inconvenience. Attempts to overcome some of these objections have not been entirely satisfactory.

Thus, in U.S. Pat. No. 2,811,158, the threshing mechanism is conventional but the mixture of separated grain and refuse material is introduced into a large perforated separating drum within which the mixture is rotated and advanced to provide an extended time period for grain separation axially of the drum, and through the peripheral wall thereof.

The grain separator of U.S. Pat. No. 3,425,423 has a threshing mechanism which functions to throw some of the threshed grain against an impact deflector assembly, concurrently with directing the remainder of the material into a revolving screened drum for final grain separating purposes.

With respect to the threshing apparatus of U.S. Pat. No. 2,053,148, a threshing cylinder is rotatable within a stationary separating drum, which is expandible transversely thereof to accommodate different kinds and conditions of grain. However, only the lower portion of the stationary drum is perforated for grain separating or screening purposes. In the degerminator apparatus of U.S. Pat. No. 2,108,655, there is disclosed a rotatable tapered cylinder axially movable relative to a coaxial stationary tapered cylinder to vary the concentric spacing therebetween to control the grinding action of the degerminator.

SUMMARY OF THE INVENTION

The threshing apparatus is economical in cost, efficient in operation and capable of high capacity threshing with a minimum of plugging of the separating structure. The coaxial assembly of the tapered threshing unit and the tapered separating cylinder in a concentrically spaced relation and for relative axial movement to vary such spacing provides for the handling of grains of different size and density. The arrangement of the concave grates and the separating grates over the full peripheral surface of the separating cylinder provides for a concurrent threshing and separating action of maximum duration. With the inlet of the threshing zone located at the smaller ends of the threshing unit and separating cylinder and the outlet at the larger ends thereof, the path of the material being threshed is progressively increased axially of the apparatus whereby the harder-to-thresh grain is acted upon separately and for a longer period of time than the easier-to-thresh grain. As a result, there is less grain breakage or crop damage of the earlier threshed grain since it is permitted to pass directly through the separating cylinder at positions adjacent the smaller end thereof.

By virtue of the relative rotation of the threshing unit and separating cylinder, the aggressiveness and/or the capacity of the threshing action may be varied to most efficiently handle the grain being threshed. Importantly, rotation of the separating cylinder provides for the separation of the threshed grain by the action of centrifugal force rather than by gravity action alone. The grain separation is thus rendered more effective with a resultant decrease in the tendency of the grain to become lodged or plugged in the separating grates or concaves of the separating cylinder. Relative rotation of the threshing unit and separating cylinder additionally provides for a force feeding of the refuse material through the apparatus which, in conjunction with the force separation of the threshed grain through the separating cylinder, provides for a high capacity threshing operation. Since the cross-sectional area of the threshing zone is progressively increased from the inlet to the outlet thereof, the threshing capacity of the apparatus is controlled directly at the feeding or supply end thereof.

DESCRIPTION OF THE DRAWINGS

FIG. 2 is an enlarged perspective view, with parts broken away, showing the assembly relation of, and the supporting frame for, the relatively rotatable threshing cylinder and separating cylinder of the thresher apparatus;

FIG. 3 is an enlarged sectional detail view taken on the line 3—3 in FIG. 2;

FIG. 4 is a perspective view of the separating cylinder shown in FIG. 2, with a part thereof broken away;

DESCRIPTION OF THE PREFERRED EMBODIMENTS

Figure 1:
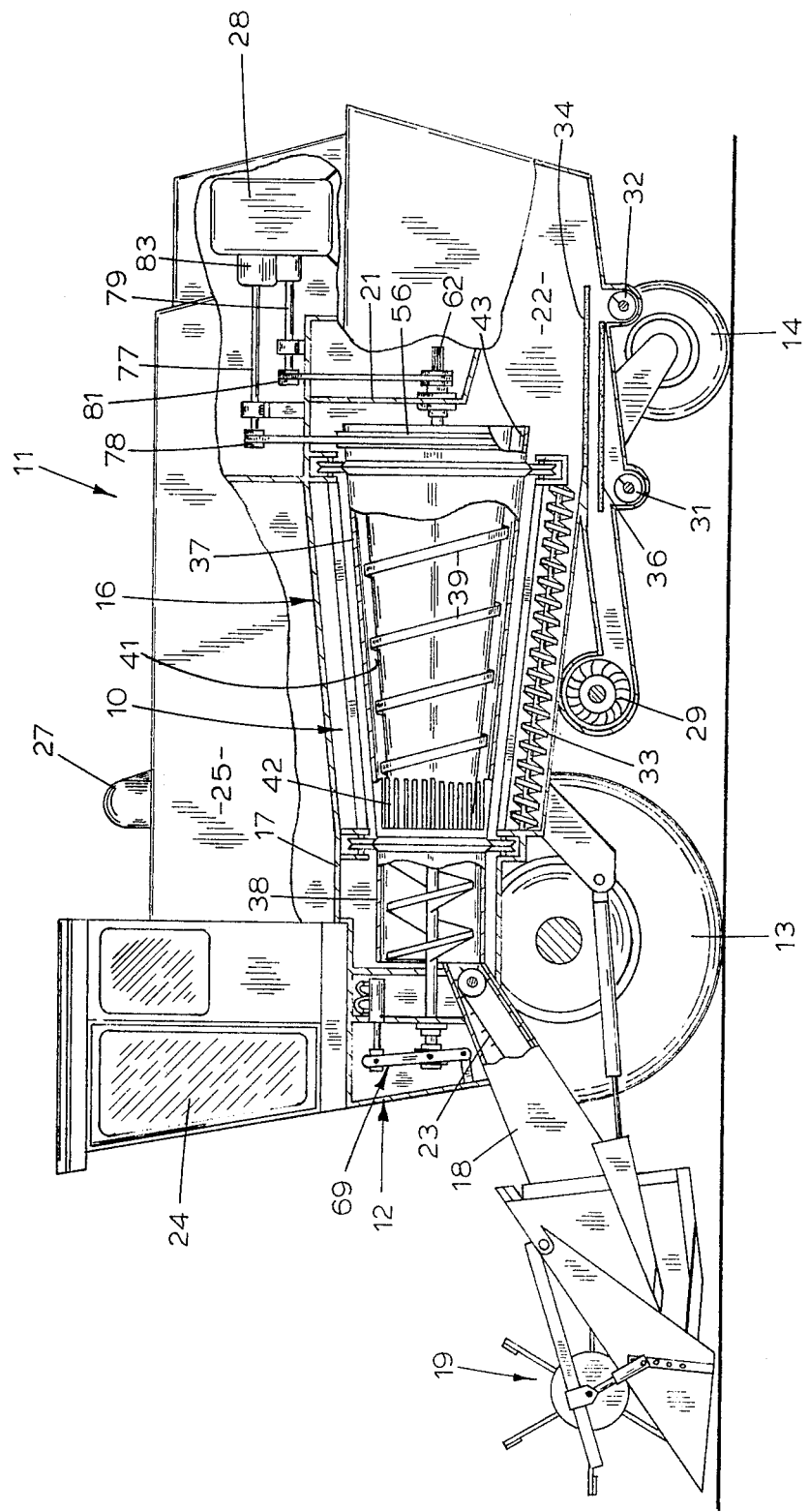
FIG. 1 is a side elevational view of a combine that incorporates the thresher apparatus of this invention, with some parts being broken away and other parts shown in section for the purpose of clarity.

Referring to the drawings, the threshing apparatus of this invention, indicated generally at 10 in FIG. 1, is shown in assembly relation with a combine 11 having a chassis 12 with front driven wheels 13 and steerable rear wheels 14. The apparatus 10 is enclosed within a housing member or shroud 16 of an irregular shape having a forward portion 17 for communication with the forwardly and downwardly inclined hood 18 that forms part of a mowing unit 19. A rear portion 21 of the shroud 16 has an outlet 22 for the discharge of refuse material received from the threshing apparatus 10. An endless conveyor 23 for feeding the grain material to be threshed into the forward portion 17 of the shroud 16 is located within the hood 18. An operator's cab 24 having controls for the operation of the combine 11 and threshing apparatus 10 is mounted at the forward end of the chassis 12 which also carries a storage bin 25 for the separated or clean grain associated with an unloading auger 27. The power source of the combine and threshing apparatus is an engine 28 located adjacent the rear end of the combine.

The conventional combine components not specifically related to the present invention and which are more or less schematically disclosed in FIG. 1 are a blower 29, a clean grain auger 31 for conveying clean grain to the combine storage bin 25 and a tailings auger 32. Arranged below and extended longitudinally of the threshing apparatus 10 is an elongated screw conveyor 33 which receives threshed or separated grain from the threshing apparatus for discharge onto a chaffer sieve 34. The chaffer sieve is reciprocated in a fore and aft direction so as to pass grain and tailings to a grain sieve 36 that is disposed immediately beneath the chaffer sieve and is also reciprocated in a forward and aft direction to separate the grain from the tailings. The clean grain passes through the sieve 36 and into the clean grain auger 31 while the tailings are delivered rearwardly to the tailings auger 34. The blower 29 produces an air current for flow through the chaffer sieve 34 and grain sieve 36 to carry away the chaff through the outlet 22 of the shroud 16. The clean grain collected by the auger 31 is delivered to the combine grain tank or storage bin 25.

Figure 5:
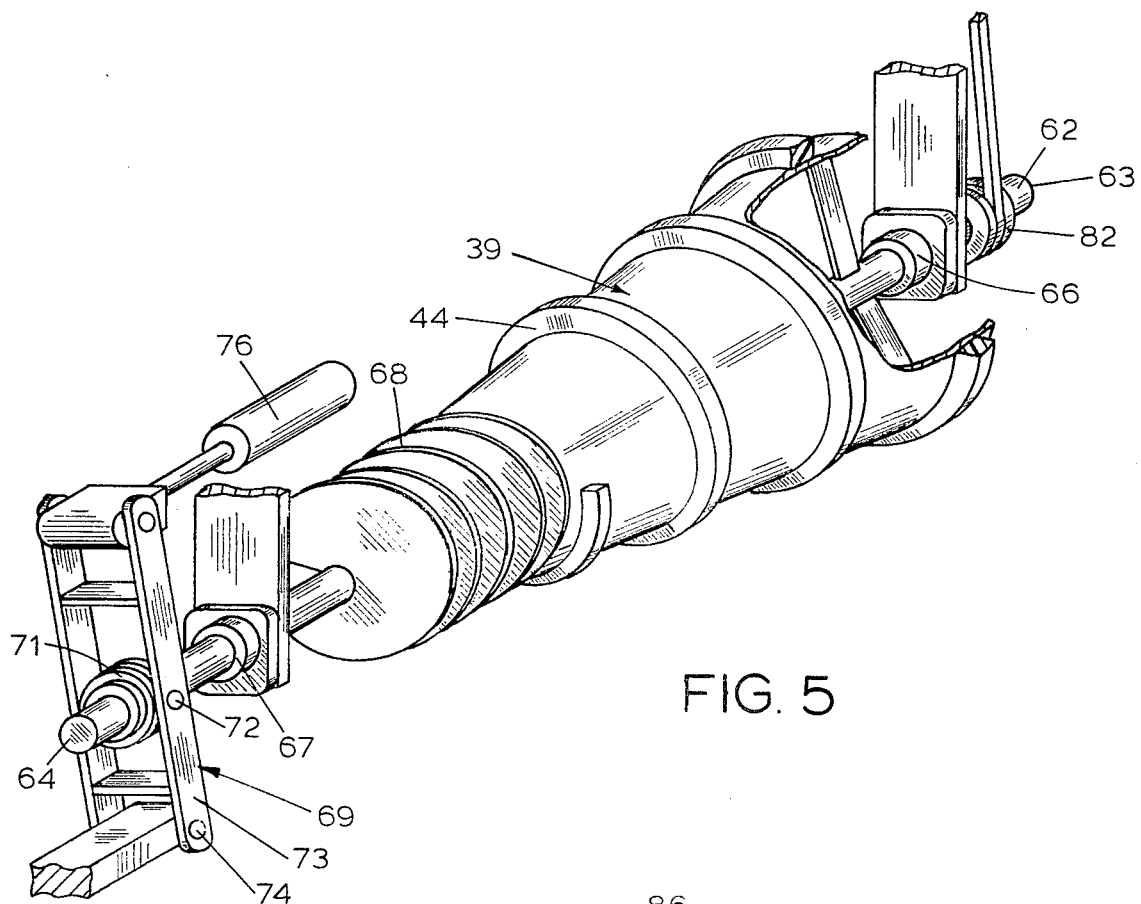
FIG. 5 is a perspective view of the thresher cylinder shown in assembly relation with the mechanism for adjustably axially moving the thresher cylinder relative to the grain separating cylinder associated therewith.

The combine 11 is thus seen to be of a generally conventional structure except for the threshing apparatus 10 of this invention which, as shown in FIGS. 1 and 2, includes an outer tapered separating cylinder 37 having a forwardly extended transition section 38 of a cylindrical shape. Arranged in a coaxially aligned concentrically spaced relation within the tapered outer separating cylinder 37 is an associated inner tapered threshing cylinder 39 (FIGS. 1 and 5). The space 41 (FIG. 1) between the tapered cylinders 37 and 39 forms a threshing zone that has an inlet 42 at the small or forward end of the cylinders and an outlet 43 at the rear or large ends of the cylinders. Helically wrapped about the peripheral surface of the threshing cylinder 39 is a rub or rasp bar 44 for threshing the grain supplied to the threshing zone or space 41. The grain from the threshing zone 41 is separated from the refuse material such as straw or the like by the provision of concave grates 46 and separating grates 47 relatively arranged over the entire peripheral surface of the separating cylinder 37. The concave grates 46 (FIGS. 2 and 4) are circumferentially spaced about the forward section of the outer tapered cylinder. The separating grates 47 are circumferentially spaced about the outer separating cylinder over the axial length thereof located between the concave grates 46 and the large end of the separating cylinder. It is seen, therefore, that the grates 46 and 47 are disposed over substantially the full area of the peripheral surface of the outer separating cylinder 37. In other words, the grates 46 and 47 extend circumferentially the full three hundred sixty (360°) degrees of rotation of the separating cylinder over substantially the axial length thereof. The grates 46 and 47 are relatively arranged and constructed so as to reduce to a minimum any tendency of the separating cylinder to vibrate during rotation thereof.

The separating cylinder 37 is rotatably supported within an elongated open frame structure 50 (FIGS. 1 and 2) suitably mounted in a fore and aft direction on the combine chassis 12 and including a pair of longitudinally spaced upright end frames 49 and 51 (FIG. 2). Each end frame is of a substantially square shape in side elevation with the end frame 49 smaller in size than the end frame 51 and which end frames hereinafter will be referred to as a front upright frame and a rear upright frame, respectively. The frames 49 and 51 are interconnected at opposite corner portions 52 and 53 thereof, respectively, by longitudinal side frame members 54.

The large end of the outer separating cylinder 37 has a circumferentially extended pulley member 56 (FIGS. 2 and 3) and an adjacent circumferentially extended track member 57 of a V-shape in transverse cross section. The track member 57 is arranged within the lateral confines of the rear upright frame 51 for coacting guided engagement with rollers 58, illustrated as four in number, and each of which is rotatably mounted in the upright end frame 51 at a corner portion 53 thereof. The forward or small end of the tapered separating cylinder 37 is provided with a circumferential track member 59 positioned within the lateral confines of the front upright frame 49 for coacting guided engagement with rollers 61 carried at the corner portions 52.

The inner or threshing cylinder 39 (FIGS. 1 and 5) is mounted on a shaft 62 having a rear end section 63 and a front end section 64 rotatably supported in bearings 66 and 67, respectively, suitably carried on the combine chassis 12. Also mounted on the shaft 62 forwardly of the front or small end of the threshing cylinder 39 is an auger 68 located within the transition section 38 of the separating cylinder 37 and adapted to receive the mowed grain material from the conveyor 23 for delivery into the inlet 42 of the threshing zone 41.

To efficiently thresh grain materials to suit the particular characteristics thereof as to size, moisture content and density, the cross sectional area of the threshing zone 41 may be varied by axially moving the threshing cylinder 39 relative to the separating cylinder 37. For this purpose, there is provided a shifting mechanism 69 (FIGS. 1 and 5) which includes a collar 71 fixed on the forward end of the shaft 62 and formed with an annular circumferential groove for receiving the trunions 72 of a yoke or lever member 73. The yoke member 73 has one end pivotally connected at 74 to the chassis 12 and its opposite end pivotally connected to a double acting hydraulic cylinder assembly 76 for pivotal movement relative to the pivot 74. Thus, on extension and retraction of the hydraulic cylinder assembly 76, the shaft 62 is axially moved, in a well-known manner, relative to its supporting bearings 66 and 67 to in turn increase or decrease the transverse spacing between the cylinders 37 and 39. In this respect, the spacing would be at a minimum when the threshing cylinder 39 is received entirely within the separating cylinder 37.

In the operation of the threshing apparatus 10, the cylinders 37 and 39 are relatively rotated with the threshing cylinder 39 rotated at a higher speed relative to the separating cylinder 37 to provide for the necessary rubbing or threshing action within the threshing zone. In this respect, the separating cylinder 37 is rotatable at speeds from forty to sixty rpm relative to speeds of from three hundred to twelve hundred rpm of the threshing cylinder 39. The relative rotational speeds are adjustable to provide for the highest threshing capacity of the apparatus with a minimum of grain cracking or crop damage. This adjustment is made concurrently with the adjustment of the shifting mechanism 69 to vary the transverse spacing between the cylinders. Thus, if the threshing cylinder 39 is operated at too high a speed, relative to the separating cylinder 37 and the transverse spacing between the cylinders is insufficient to accommodate the size of the grain being threshed, the threshing operation may take place with crop damage. Conversely, with a too slow rotation of the threshing cylinder, and a concentric spacing greater than is required for the size of the grain being threshed, crop damage would be minimal with resultant reduced capacity and inefficient operation of the threshing apparatus. However, by adjusting the relative rotational speeds of the separating cylinder 37 and the threshing cylinder 39, concurrently with the adjustment of the cross-sectional area of the threshing zone 41, the proper aggressiveness of the threshing action along with a high efficient capacity production is readily obtainable.

By virtue of the rotation of the separating cylinder 37, the threshed grain in the threshing zone 41 is moved continuously by centrifugal force and during the entire period of the threshing operation through the concave grates 46 and separating grates 47 of the separating cylinder 37. Plugging of the grates is thus substantially eliminated. Since the grates cover an area substantially coextensive with the peripheral surface of the separating cylinder 37, the separating action by centrifugal force takes place with the easier-to-thresh grain passing through the separating cylinder 37 adjacent the forward or small end thereof and the harder-to-thresh grain over the rear section thereof. Since the path of travel of the material to be threshed is progressively increased through the threshing zone 41, the harder-to-thresh grain is acted upon for a longer period of time than the easier-to-thresh grain. Since the removed grain is permitted immediate passage through the separating cylinder by centrifugal force over the complete length and peripheral surface thereof, crop damage is maintained at a minimum.

It is seen, therefore, that the capability of changing the rotational speeds of the cylinders 37 and 38 in conjunction with varying the transverse spacing therebetween, enables the operator to adjust the operation of the combine to obtain threshing conditions that provide the highest capacity and efficiency for the crop being harvested. Although rotation of the cylinders 37 and 39 will most usually be in the same direction, it may be desirable to at times rotate the separating cylinder 39 reversely relative to the direction of rotation of the threshing cylinder 37 to give additional control of the threshing operation or to assist in clearing the cylinder 37 should it become plugged.

The separated or cleaned grain is contained within the shroud 16 for collection at the bottom thereof and removal by the conveyor 33 for further separating action by the sieves 34 and 36 and blower 29. The cleaned grain is taken by the auger 31 for deposit in the combine storage bin 25 with the tailings and chaff being discharged to the ground.

The separating cylinder 37 (FIG. 1) is driven from the engine 28 through a power shaft 77 having a variable speed pulley 78 belt connected with the pulley 56 at the rear end of the separating cylinder. The threshing cylinder 39 is also operated by the engine 28 from a power shaft 79 having a variable speed pulley 81 belt connected to a driven pulley 82 mounted on the rear end section 63 of the shaft 62 (FIG. 5). The power shafts 77 and 79 are illustrated as operatively associated with a gear unit 83 arranged in a direct driven relation with the engine 28 and including a cab controlled reversing mechanism for the shaft 77.

Figure 6:
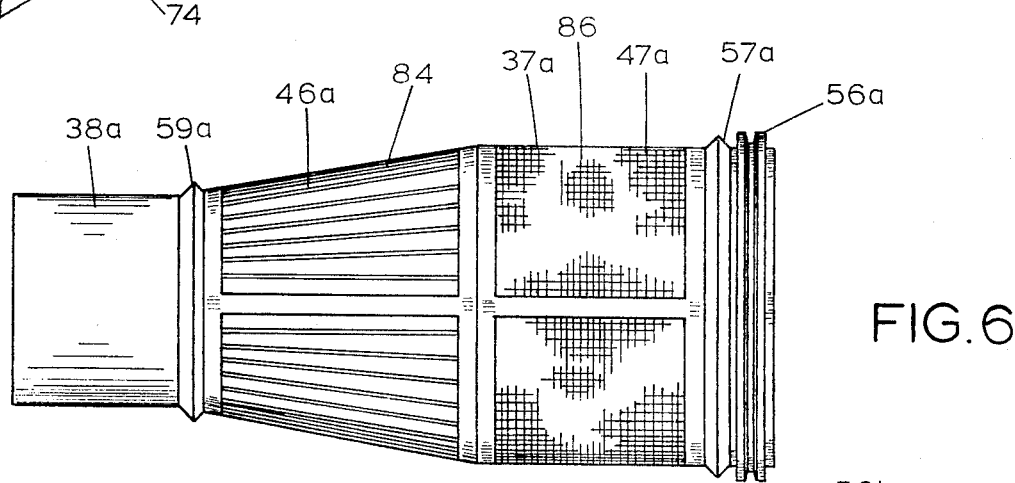
FIG. 6 is a side elevational view of a modified form of the separating cylinder.

A modified form of the separating cylinder 37 is shown in FIG. 6. The cylinder 37a of FIG. 6 includes a tapered cylindrical front section 84 and a rear section 86 of a straight cylindrical shape. The tapered section 84 is provided over substantially the full peripheral surface thereof with concave grates 46a while separating grates 47a cover substantially the full peripheral surface of the straight cylinder section 86. A threshing cylinder (not shown) for operative association with the separating cylinder 37a would be of a construction for mating assembly within and coacting operation with the cylinder 37a and equipped with a feed auger for reception within the transition section 38a of the cylinder 37a. This construction would provide for a variation in the transverse dimension of the threshing zone over the tapered sections of the cylinders while retaining constant the transverse dimension between the straight cylindrical sections.

Figure 7:
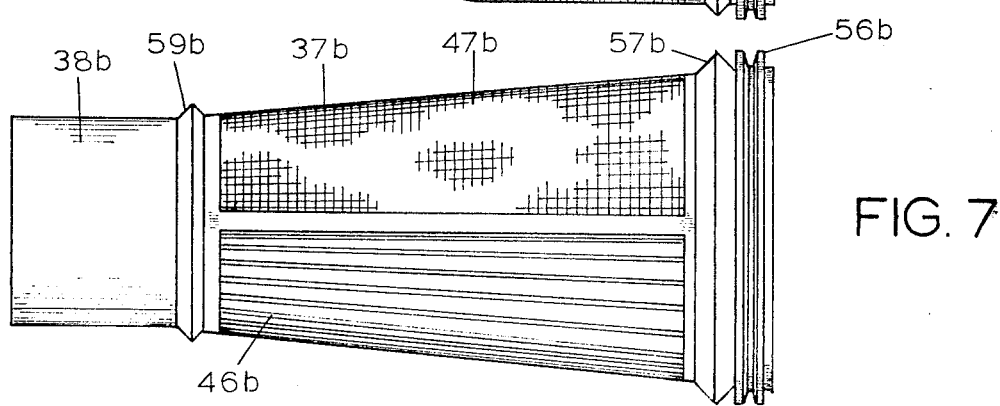
FIG. 7 is a side elevational view of another modified form of the separating cylinder.

The modified form of separating cylinder 37b in FIG. 7 is the same in all respects as the separating cylinder 37 described in connection with FIG. 4 except that the separating grates 47a and concave grates 46a are alternately arranged circumferentially of the cylinder 37b and extended axially over the full length of the cylinder so as to cover substantially the entire peripheral surface thereof.

Although the invention has been described with respect to preferred embodiments thereof, it is to be understood that it is not to be so limited since changes and modifications can be made therein which are within the full intended scope of this invention as defined by the appended claims.

I claim:

1. Apparatus for threshing grain material and separating the threshed grain from the residual grain material comprising:
    (a) an elongated supporting frame,
    (b) a shaft extended longitudinally of and rotatably supported on said frame,
    (c) a threshing unit mounted on said shaft for rotation therewith including a tapered cylindrical body member having a continuous peripheral surface and a rub bar helically extended about said surface,
    (d) a rotatable grain separating cylinder having a peripheral surface tapered over the axial length thereof,
    (e) means for rotatably mounting said separating cylinder on said frame in a coaxial concentrically spaced relation about said threshing unit, to form a threshing zone therebetween having an inlet and an outlet, said cylindrical body member and separating cylinder being substantially coextensive in axial length,
    (f) concave grates and separating grates arranged circumferentially of and over substantially all of the peripheral surface of said grain separating cylinder,
    (g) means for rotating said threshing unit and grain separating cylinder at relative rotational speeds,
    (h) means for supplying the grain material to be threshed into the inlet of said threshing zone, with the clean grain in the threshing zone being moved through said concave grates and separating grates by centrifugal force, concurrently with the travel of the grain material from said inlet toward said outlet,
    (i) means for collecting the clean grain passing through said separating cylinder, and
    (j) means for removing the residual material only from the outlet end of said threshing zone.

2. The apparatus for threshing grain according to claim 1 including:

(a) means for relatively axially moving said separating cylinder and threshing unit to uniformly vary the transverse spacing therebetween.

3. The apparatus for threshing grain according to claim 1, wherein:

(a) said concave grates and separating grates extend longitudinally of said separating cylinder over substantially the full length thereof and in an alternate relation circumferentially about said separating cylinder.

* * * * *